Dec. 16, 1969 H. Y. WONG 3,484,683

THIN FILM MAGNETOMETER CIRCUIT

Filed Sept. 11, 1967 2 Sheets-Sheet 1

INVENTOR.
HAROLD Y. WONG
BY
George C. Sullivan
Agent

Dec. 16, 1969 H. Y. WONG 3,484,683

THIN FILM MAGNETOMETER CIRCUIT

Filed Sept. 11, 1967 2 Sheets-Sheet 2

INVENTOR.

HAROLD Y. WONG

BY

George [signature]

Agent

3,484,683
THIN FILM MAGNETOMETER CIRCUIT

Harold Y. Wong, Sunnyvale, Calif., assignor to Lockheed Aircraft Corporation, Burbank, Calif.

Filed Sept. 11, 1967, Ser. No. 666,784
Int. Cl. G01n 33/02
U.S. Cl. 324—43 1 Claim

ABSTRACT OF THE DISCLOSURE

A thin-film magnetometer uses a crystal-controlled oscillator as a source of stable excitation for tuning of the pumping coil. A DC feedback signal from the output of the magnetometer is fed back to the tuned output circuit of the magnetic sensor for cancellation of the externally measured field to prevent the magnetic sensor from operating in the irreversible domain wall displacement region. Operation in the reversible domain wall displacement region enhances stable operation of the magnetometer over extensive time intervals.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

In the prior art magnetometers have been suggested for use as sensor for attitude sensing in a closed loop control system to provide an attitude reference for reinstating inertial reference in space applications. Such magnetometers are required to operate with no moving parts other then solenoids. In such applications it is desirous to have a sensor with unlimited life and stability during the life of the sensing device. To this end the thin film magnetometer has been utilized. However, in the prior art conventional oscillators, such as a transistorized Colpitts or Hartley for examples, have been utilized as an excitation source for thin film magnetometers such as that described in United States Patent Ser. No. 3,271,665 of Castro et al., issued Sept. 6, 1966. Such conventional oscillators tend to be less stable than desired or required for certain applications as noted hereinabove.

In the prior art of thin-film magnetometers, difficulties of irreversible domain wall motion are encountered with large applied magnetic fields causing hysterisis and backlash of the output voltage. These may be avoided through the use of a third coil wound about the input and output coils with direct current applied thereto. However, the foregoing solution has the disadvantage of requiring an additional coil and power supply which adds to the cost of fabrication and operation, and weight of the prior art magnetometer, which is highly undesirable for space applications.

The present invention obviates the foregoing and other disadvantages of the prior art especially for space applications, by providing an integrated circuit arrangement with no moving parts wherein a crystal-controlled oscillator is utilized for excitation of the input tuned circuit having a parallel connected variable capacitor and "pumping" coil, which is recognized as being substantially more stable than conventional oscillators discussed hereinabove.

In addition to the foregoing the present invention eliminates use of a third coil used in the prior art thin-film magnetometers through the use of an even harmonic signal, which is taken from the output tuned circuit and fed back to the output circuit as a direct current signal after passing through a phase detector and a direct current amplifier. The feedback signal eliminates the difficulties of irreversible domain wall motion encountered with large applied magnetic fields by continuously reducing magnetic buildup in the thin magnetic film of the magnetometer. Thus, enhanced stability of the output signal for long time intervals is effectuated.

Accordingly, a primary object of the invention is to provided an improved thin-film magnetometer integrated circuit arrangement having stable operation and unlimited life.

Another object of the invention is to provide a thin-film magnetometer circuit which derives stability of operation from a crystal-controlled oscillator.

Still another object of the invention is to provide a thin-film magnetometer circuit with feedback signal arrangement to produce enhanced stability by maintaining the operation of the magnetic film in the reversible domain wall displacement region.

Yet another object of the invention is to provide a thin-film magnetometer circuit arrangement wherein the direct current output thereof is positive or negative and useful as an attitude control signal.

The novel features which are believed to be characteristic of the invention, both as to its organization and method of construction and operation, together with further objects and advantages thereof, will be better understood from the following description considered in connection with the accompanying drawings in which an illustrative embodiment of the invention is disclosed, by way of example. It is to be expressly understood, however, that the drawings are for the purposes of illustration and description only and do not constitute a limitation of the invention.

Figure 1:
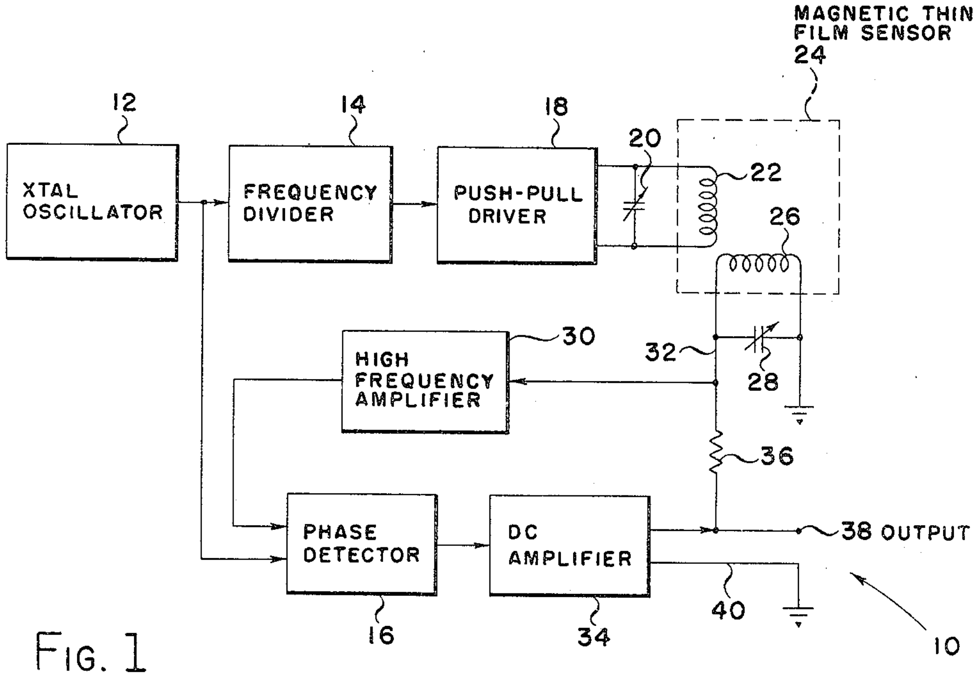
FIGURE 1 is a block diagram of a thin-film magnetometer and associated circuit illustrating the elements of the invention.

While this invention is believed to be applicable to other magnetometers of other types, it is illustrated and described herein with particular reference to its application with magnetometers which utilize magnetic thin-films. There is shown in FIGURE 1 an integrated circuit and thin-film magnetometer 10 which includes a crystal-controlled oscillator 12 the output of which is connected to a frequency divider 14 and a phase detector 16. The output of divider 14 is connected to a push-pull driver circuit 18, the output of which is connected to a parallel-connected variable capacitor 20 and an input pumping coil 22 which is wound about a thin magnetic film 24. The output portion of the circuit includes a parallel connected output coil 26 which is disposed orthogonally to input coil 22 and variable capacitor 28, an amplifier 30 connected to one leg 32 of the output coil 26 while the other leg is grounded. The output of amplifier 30 is connected to the input phase detector 16, and a direct current amplifier 34 is connected to the output of phase detector 16, while a resistor 36 is connected between amplifier 34 and conductor 32. The circuit arrangement is completed by an output terminal 38 and ground connection 40 from amplifier 34.

Figure 2:
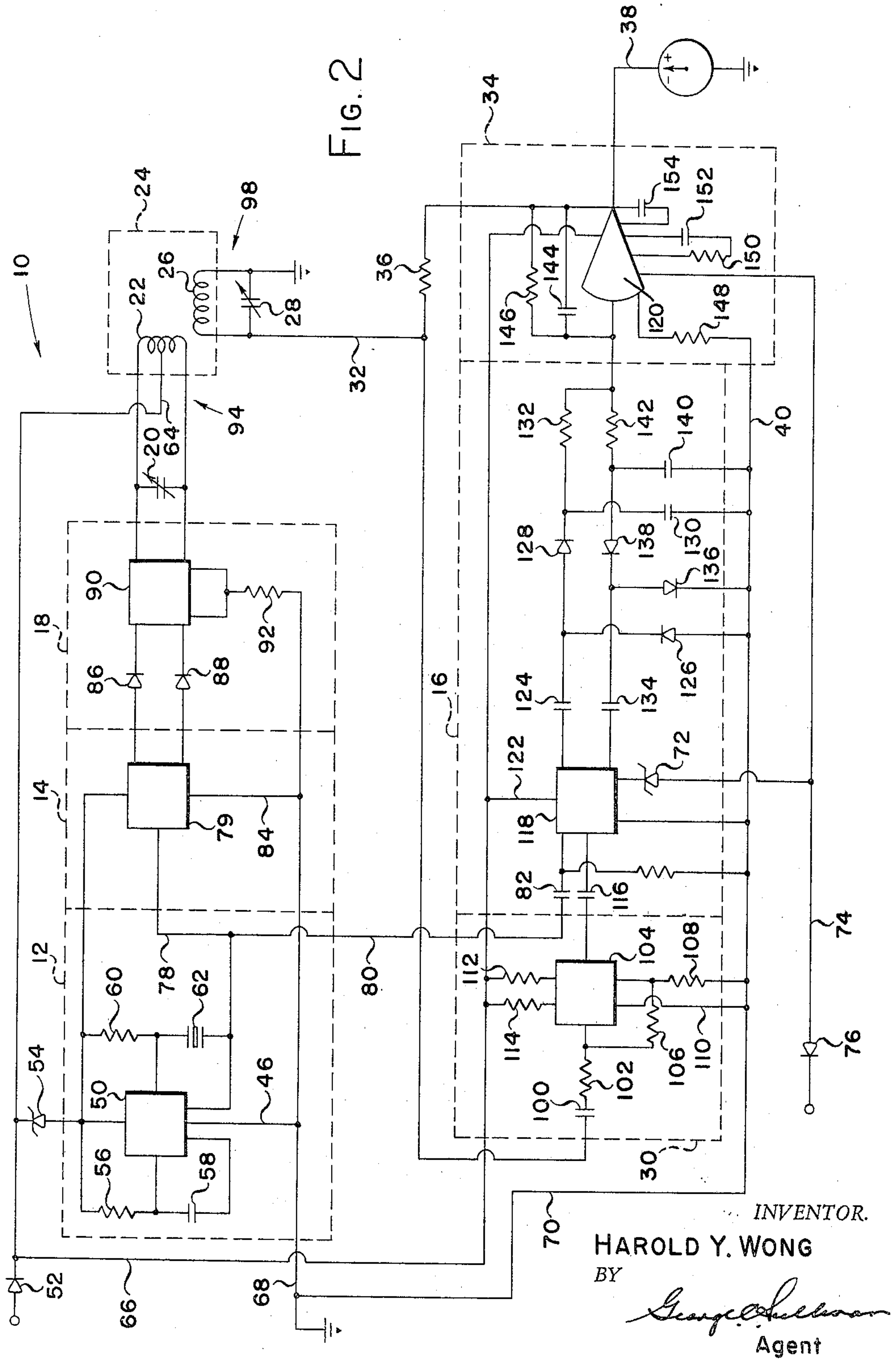
FIGURE 2 is a schematic diagram in greater detail of the invention shown in FIGURE 1.

A more detailed description of the invention will be set forth hereinafter with reference to FIGURES 2 and 3. With reference to FIGURE 2 wherein thin-film magnetometer circuit arrangement 10 is shown in greater detail, crystal-controlled oscillator circuit 12 consists of a micrologic flip-flop circuit 50 having eight connection terminals, a first resistor 56, a capacitor 58, a second resistor 60 and a crystal oscillator 62, all of which are interconnected and connected to certain terminals of the flip-flop circuit 50.

A positive voltage is supplied to circuit arrangement 10 along a path through a diode 52. One branch from diode 52 is connected to crystal controlled oscillator 12 and frequency divider 14 through a Zener diode 54 and a conductor 64 which is connected to the center tap of pumping coil 22. The other branch of the positive voltage along a conductor 66 is connected to high frequency amplifier 30, phase detector 16 and direct current amplifier 34. The ground connections for the various circuits are provided by conductors 68 and 70. A negative voltage reference is provided to phase detector 16 through Zener diode 72 by conductor 74 through forward diode 76.

Returning to crystal-controlled oscillator 12 an output signal of two (2) megacycles, for example, is fed to frequency divider 14 along conductor 78 and to phase detector 16 along conductor 80 through a series connected capacitor 82. Frequency divider 14 is grounded along a conductor 84 which is connected to conductor 68. Frequency divider 14 is essentially a Reset-Set-Trigger (RST) binary circuit 79 to divide the directly coupled two (2) megacycle signal by two, giving a one (1) megacycle signal output. The output signal from divider 14 is fed to driver circuit 18 through a pair of diodes 86 and 88, the outputs of which are connected to the bases of two transistors in a dual transistor circuit arrangement 90 which makes up driver circuit 18. The emitters of dual transistor arrangement 90 of driver circuit 18 are connected to a ground connection through a resistor 92 connected to ground connection 68. The output signals of circuit arrangement 90 are taken from the collectors of the two transistors of circuit 90 and fed to the input tuned circuit 94 comprising variable capacitor 20 and pumping coil 22. The excitation circuit of the magnetometer is completed by a ground connection 96 between conductor 68 and flip-flop circuit 50.

The output portion of the magnetic thin film sensor consists of a tuned circuit 98 including variable capacitor 28 and output pickup coil 26. One leg 32 of the tuned circuit 98 is connected to high frequency amplifier 30 through a series connected capacitor 100 and a resistor 102 which is in turn connected to a base of a first transistor of a second dual transistor circuit arrangement 104. Another connection through a resistor 106 is connected to the base of the first transistor and to the emitter of the other dual transistor and then to ground through a resistor 108 to conductor 70. The emitter of the second transistor in the dual transistor circuit arrangement 104 is grounded along conductor 110 connected to conductor 70. Positive voltage connections to second circuit arrangement 104 are made through resistors 112 and 114, which are connected respectively, to the collector of the first transistor, and to the base of the first transistor and collector of the other transistor which forms a common connection. The output of the high frequency amplifier 30 is fed to phase detector 16 through a coupling capacitor 116.

Phase detector 16 includes a differential amplifier 118 and interconnected resistors, capacitors, diodes and Zener diodes. As shown in FIGURE 2 a positive voltage is applied to differential amplifier 118 by a conductor 122 connected to conductor 66; a negative voltage connection is made through conductor 74 and Zener diode 72. Part of the input signal to differential amplifier 118 is supplied through coupling capacitor 82 from crystal oscillator circuit 12 as a reference signal and another signal through the coupling capacitor 116, the output of high frequency amplifier 30. The output signals from differential amplifier 118 are sinusoidal signals which are superimposed on a direct current level depending upon the output of the magnetometer output coil 26 which is fed along conductor 32 to amplifier 30. A positive output signal from differential amplifier 118 is coupled through a first capacitor 124 and is rectified and filtered through a circuit network defined by a first diode 126 connected at the other end to ground, a second diode 128 the output end of which is grounded through a capacitor 130 and also connected to an operational amplifier 120 in the form of an integrated circuit through a resistor 132. The negative output signal from differential amplifier 118 is coupled through a second capacitor 134 which is connected to ground through a diode 136 and to the anode of a diode 138 which is connected to ground through capacitor 140 and to operational amplifier 120 through a resistor 142. Both the positive and negative signal output from differential amplifier 118 are fed back to output tuned circuit 98 through a parallel connected capacitor 144 and resistor 146 which is connected to series resistor 36 and the output terminal 38 of operational amplifier 120.

In operation, the output of phase detector 16 is a direct current from the rectifier and filter network at the junction of resistor 132 and 142 and fluctuates either plus or minus, and is subsequently amplified by operational amplifier 120. A resistor 148 connected between amplifier 120 and ground connection 70 is utilized to minimize the offset of amplifier 120. A series-connected resistor 150 and capacitor 152, and capacitor 120 are connected, as shown, for frequency compensation. It should be noted that capacitor 144 is utilized to improve the stability of operational amplifier 120 and to reduce the ringing for large closed loop gain.

As mentioned briefly hereinabove, the output of operational amplifier 120 with series resistor 36 provides a direct current signal which is fed back to the output tuned circuit 98 to cancel the field being measured by the tuned circuit. Cancellation of the measured field in this manner keeps the thin film 24 of the magnetometer operating in the region of the reversible domain displacement region shown in FIGURE 3.

Figure 3:
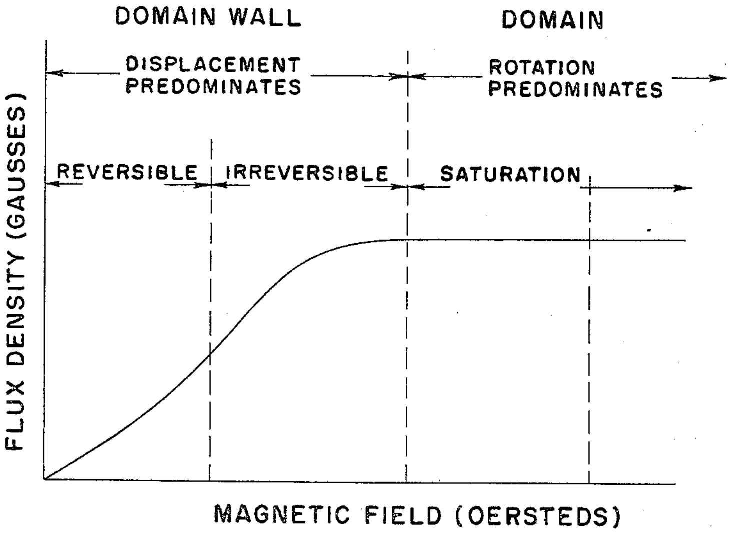
FIGURE 3 is a reproduction of a typical magnetization curve illustrating the various domains in which a magnetic thin-film may operate.

With reference to FIGURE 3 there is shown a typical magnetization curve of flux density, measured in gausses vs. magnetic field, measured in oersteds, illustrating the various regions in which the thin film of a magnetometer may operate. As has been indicated hereinabove, it is desirable for long term stability to have the film operate in the reversible area of the domain walls displacement of the film. The desired result is thus accomplished by the feedback arrangement described hereinabove.

In closing, it may be useful to summarize some of the advantages of the present invention. One such advantage involves the use of integrated circuits for the reduction of size and weight of the circuitry. In this connection, it should be noted that the elimination of the need for discrete components such as inductances and transformers is highly desirable.

Another advantage, and possibly a more important one, is the use of the feedback loop to prevent the magnetic thin film from operating in the irreversible or saturation regions of the film. By limiting the operation of the thin-film to the reversible domain wall displacement region long term stability of operation is made possible.

It is to be understood that the above designated examples are only illustrative of the principles applicable to the invention, and numerous other areas and modifications may be designed by those skilled in the art without departing from the spirit and scope of the invention. Accordingly, it is to be understood that the present invention. Accordingly, it is to be understood that the present invention is limited only by the spirit and scope of the intended claims. The term "means" as used in the appended claims is intended to cover various equivalents for performing the specific function or functions and is not to be construed as limited to the specific embodiment or embodiments shown.

What is claimed as new is:

1. An improved thin film magnetometer circuit comprising in combination:

(a) oscillator means having an output terminal for generating a high frequency stable oscillator frequency output signal, (b) digital frequency divider means connected to said output terminal of said oscillator means for dividing said oscillatory frequency by two to provide an output frequency signal from said frequency divider means of one-half said oscillator frequency, (c) driver means connected to the output of said frequency divider means for amplification of said output frequency signal therefrom, (d) a magnetic thin film having uniaxial anisotropic single domain characteristics and adapted to operate in its reversible domain wall displacement region, (e) an input coil connected to the output of said driver means and wound about said magnetic thin film for applying said output frequency signal from said frequency divider means to said thin magnetic film, (f) an output coil wound about said magnetic thin film perpendicular to said input coil for magnetically coupling to said film and detecting therefrom a second harmonic frequency signal of said output frequency signal, which said second harmonic signal is equal in frequency to said oscillator frequency, (g) untuned high frequency amplifier means connected to said output coil for amplifying the signals detected by said output coil, (h) non-inductive phase detector means comprising a differential amplifier with one input thereof connected to the output of said high frequency amplifier and the other input thereof connected to the output of said oscillator means for phase detection of said oscillator frequency output signal against said second harmonic frequency signal detected by said output coil, said phase detector means providing a positive or negative polarity direct current output signal, and (i) direct current amplifier means connected to the output of said phase detector means and providing an output signal indicative of the magnetic field applied to said thin film magnetometer, said direct current amplifier being connected to said output coil through a series-connected resistor to provide a negative feedback signal to said output coil to reduce the magnetic effect on said magnetic thin film from external magnetic fields to thereby maintain the operation of said magnetic thin film in its reversible domain wall displacement region.

References Cited

UNITED STATES PATENTS

| | | | |
|---|---|---|---|
| 2,861,242 | 11/1958 | Leavitt | 324—43 |
| 3,218,547 | 11/1965 | Ling | 324—47 |
| 3,239,754 | 3/1966 | Odom et al. | 324—47 |
| 3,271,665 | 9/1966 | Castro et al. | 324—43 |
| 3,400,328 | 9/1968 | Penn et al. | 324—43 |
| 3,416,072 | 12/1968 | Fussel et al. | 324—43 |

FOREIGN PATENTS

| | | |
|---|---|---|
| 592,241 | 9/1947 | Great Britain. |

OTHER REFERENCES

Middlelhoek, S., Magnetic Field Measurement, I.B.M. Technical Disclosure Bulletin, vol. 4, No. 6, November 1961, pp. 42–43.

Ling, S. C., Fluxgate Magnetometer for Space Application, J. Spacecraft, vol. 1, No. 2, March-April 1964, pp. 175–180.

RUDOLPH V. ROLINEC, Primary Examiner

R. J. CORCORAN, Assistant Examiner